United States Patent
Krishna et al.

(10) Patent No.: US 9,355,567 B2
(45) Date of Patent: May 31, 2016

(54) SYSTEM AND METHOD FOR HIGHLIGHTING AN AREA ENCOMPASSING AN AIRCRAFT THAT IS FREE OF HAZARDS

(71) Applicant: HONEYWELL INTERNATIONAL INC., Morristown, NJ (US)

(72) Inventors: Kiran Gopala Krishna, Karnataka (IN); Saravanakumar Gurusamy, Tamil Nadu (IN); Vishnu Vardhan Reddy Annapureddy, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 13/962,669

(22) Filed: Aug. 8, 2013

(65) Prior Publication Data

US 2015/0045994 A1 Feb. 12, 2015

(51) Int. Cl.
| G08G 5/04 | (2006.01) |
| B64C 25/44 | (2006.01) |
| G08G 5/00 | (2006.01) |
| G08G 5/06 | (2006.01) |

(52) U.S. Cl.
CPC *G08G 5/04* (2013.01); *B64C 25/44* (2013.01); *G08G 5/0021* (2013.01); *G08G 5/065* (2013.01)

(58) Field of Classification Search
CPC .................................................. G08G 5/04
USPC ............................................... 701/301, 455
See application file for complete search history.

(56) References Cited

U.S. PATENT DOCUMENTS

| 7,796,055 | B2 | 9/2010 | Clark et al. | |
| 7,903,023 | B2* | 3/2011 | Cornic | G01S 13/44 |
| | | | | 342/118 |
| 8,046,165 | B2* | 10/2011 | Sacle | G08G 5/065 |
| | | | | 340/300 |
| 8,306,745 | B1 | 11/2012 | Clark et al. | |
| 8,378,852 | B2* | 2/2013 | Naimer | G01C 23/00 |
| | | | | 340/500 |
| 8,700,234 | B2* | 4/2014 | Shafaat | G01C 21/00 |
| | | | | 701/14 |
| 8,706,388 | B2* | 4/2014 | Pschierer | G08G 5/065 |
| | | | | 340/961 |
| 2008/0106438 | A1* | 5/2008 | Clark | G08G 5/065 |
| | | | | 340/972 |
| 2009/0115637 | A1 | 5/2009 | Naimer et al. | |
| 2011/0130963 | A1 | 6/2011 | Feyereisen et al. | |
| 2012/0130624 | A1* | 5/2012 | Clark | G01C 23/00 |
| | | | | 701/117 |
| 2013/0096814 | A1 | 4/2013 | Louis et al. | |
| 2013/0110323 | A1* | 5/2013 | Knight | G01S 13/93 |
| | | | | 701/3 |
| 2013/0113819 | A1 | 5/2013 | Gurusamy | |
| 2016/0063865 | A1* | 3/2016 | Flemhmig | H04N 13/0203 |
| | | | | 348/46 |

OTHER PUBLICATIONS

Kamineni, S. et al.; Electronic Moving Map of Airport Surface on Electronic Flight Bag; Rockwell Collins, Inc., Cedar Rapids, IA; 0-7803-8539-X/04, 2004 IEEE.
EP Extended Search Report, EP 14178440.5-1810/2835795 dated Feb. 13, 2015.

* cited by examiner

*Primary Examiner* — Thomas G Black
*Assistant Examiner* — Ana Thomas
(74) *Attorney, Agent, or Firm* — Ingrassia Fisher & Lorenz, P.C.

(57) ABSTRACT

A system and method display a hazard free area around an aircraft that is modified to alert a pilot if a threshold distance between a detected object and the aircraft is reached. The modification may include, for example, altering the size of the hazard free area and its color. Additional information that may be displayed includes distance to the object, width of the hazard free area, stopping distance of the aircraft, and a route to avoid the object.

20 Claims, 12 Drawing Sheets

SYSTEM AND METHOD FOR HIGHLIGHTING AN AREA ENCOMPASSING AN AIRCRAFT THAT IS FREE OF HAZARDS

TECHNICAL FIELD

The exemplary embodiments described herein generally relates to aircraft display systems and more particularly to indicating a hazard free area around an aircraft on a moving map.

BACKGROUND

Navigation on an airport surface (taxiways/runways) can be as challenging as the airborne portion of the flight, especially in limited visibility of night and/or weather, or at unfamiliar airports. Such challenges typically result from an increase in pilot workload because the pilot must interpret the information provided on the screen occupying his thought processes when he may have many other decisions to make.

Images, in the form of symbology, are typically presented to the pilot on a display screen. The symbology commonly appears as an icon or a series of icons on the display screen and may be indicative of, for example, the aircraft's heading, direction, attitude, and orientation. Icons are also typically displayed for objects that are hazards to a taxiing aircraft. Such symbology serves an important role in providing the pilot with situational awareness concerning the orientation and environment in which the aircraft is taxiing.

During low visibility conditions and night operations, the display of these icons assist the pilot in readily identifying taxiways and objects ahead. However, typical symbology may be complex and interfere with an understanding of the displayed taxi environment.

Accordingly, it is desirable to provide a system and method for improving the display of information necessary for taxi operations, specifically the ability to avoid hazards. Furthermore, other desirable features and characteristics of the exemplary embodiments will become apparent from the subsequent detailed description and the appended claims, taken in conjunction with the accompanying drawings and the foregoing technical field and background.

BRIEF SUMMARY

A system and method are provided for highlighting an area encompassing an aircraft that is free of objects.

In an exemplary embodiment, a method for indicating a hazard free area around an aircraft on a moving map, comprises displaying an aircraft icon representing the aircraft on the moving map; displaying a swath icon representing an area around the aircraft on the moving map; detecting an object in the vicinity of the aircraft; displaying the object on the moving map; and modifying the swath icon if the object is within a first threshold distance of the swath.

In another exemplary embodiment, a method for indicating a hazard free area around an aircraft on a moving map, comprises displaying an aircraft icon representing the aircraft on the moving map; detecting a hazard in a first portion of the moving map; displaying a swath icon representing the hazard free area in a second portion of the moving map and surrounding the aircraft; and displaying the hazard on the moving map.

In yet another exemplary embodiment, a system for indicating a hazard free area around an aircraft on a moving map, the system comprises a display; a sensor configured to sense an object; a synthetic vision system configured to provide the moving map; a processor configured to designate an area around the aircraft; instruct the display to display the moving map and an icon representing the aircraft on the moving map; instruct the display to display a swath icon representing the area; instruct the display to display the object; and modify the swath icon if a distance between the aircraft and the object is within a threshold.

BRIEF DESCRIPTION OF THE DRAWINGS

The present invention will hereinafter be described in conjunction with the following drawing figures, wherein like numerals denote like elements.

DETAILED DESCRIPTION

Figure 1:
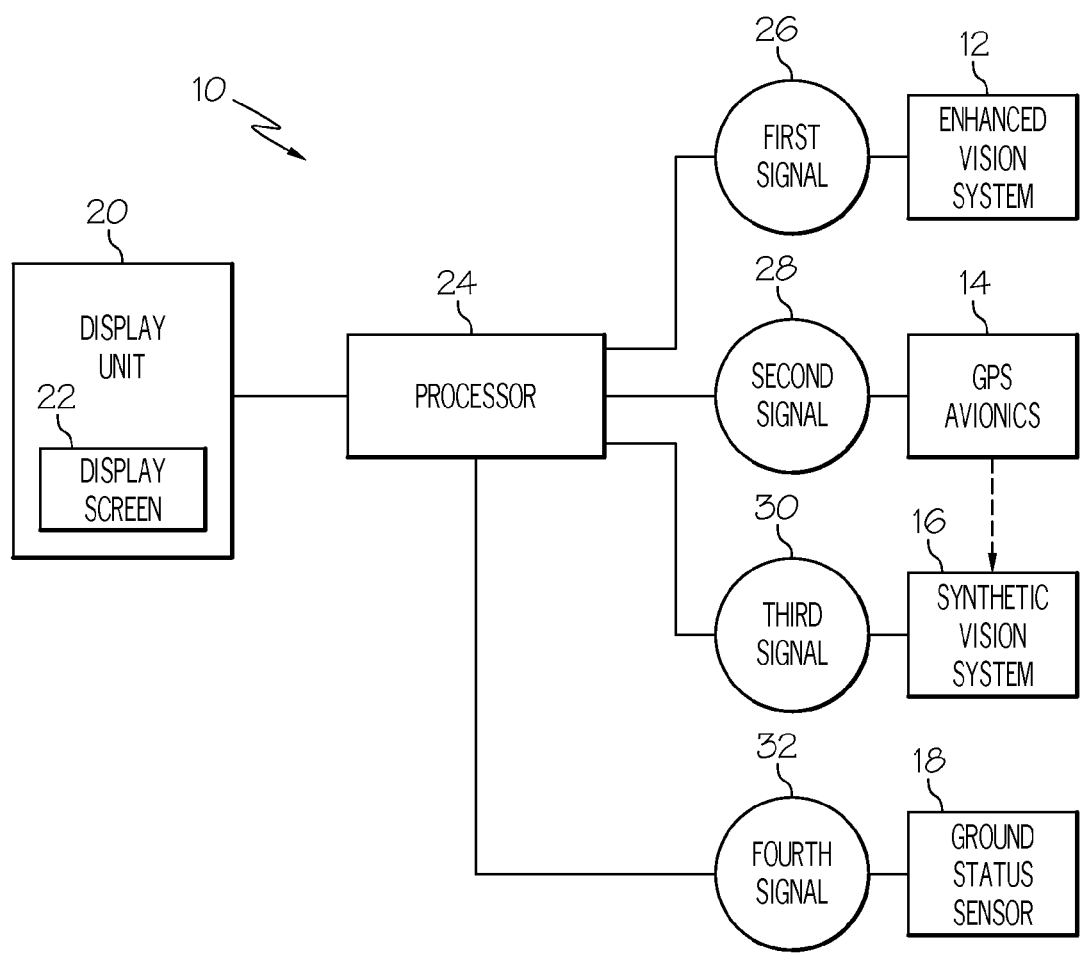
FIG. 1 is a functional block diagram of a flight display system.

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

For the sake of brevity, conventional techniques related to graphics and image processing, navigation, flight planning, aircraft controls, aircraft data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments. Any of the above devices are exemplary, non-limiting examples of a computer readable storage medium.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Any of the above devices are exemplary, non-limiting examples of a computer readable storage medium In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

Although embodiments described herein are specific to aircraft display systems, it should be recognized that principles of the inventive subject matter may be applied to other vehicle display systems.

In the embodiment illustrated in FIG. 1, system 10 includes an enhanced vision system 12 (EVS), a Global Positioning System and avionics sensors 14, a synthetic vision system 16 (SVS), a ground status sensor 18, a display unit 20, a display screen 22, and a processor 24. In equivalent embodiments, system 10 may include either additional or fewer components.

EVS 12 includes one or more sensors adapted for mounting to an aircraft and configured to detect a light signature originating from outside the aircraft. The sensor may include a visible low light television camera, an infrared camera, and millimeter wave (MMW) camera or any other light sensing device capable of detecting light either within, or outside of the visible spectrum. The light signature may include any light that is projected from, or that is reflected off of any terrain or object outside of the aircraft.

EVS 12 is configured to generate a first signal 26 and to provide first signal 26 to processor 24. First signal 26 is an electronic signal that includes information corresponding to the light signature detected by EVS 12 and which would enable processor 24 to render an image of the light signature (referred to hereinafter as "the EVS image"). For example, if the detected light signature includes components of an object adjacent to the runway, first signal 26 would enable processor 24 to render an image of the object. In some embodiments, EVS 12 may include a dedicated processor, a microprocessor, circuitry, or some other processing component that is configured to receive input from the one or more light detecting sensors and to generate first signal 26 using such inputs. In other embodiments, EVS 12 may not include a dedicated processor, microprocessor, circuitry or other processing component, in which case the first signal 26 would comprise unprocessed inputs from the light detecting sensors of EVS 12 for processing by processor(s) 24.

The SVS 16 is configured to generate a three-dimensional image of the topographical environment around the aircraft (referred to hereinafter as "the SVS image"), to generate a third signal 30 carrying an SVS Image and to provide the third signal 30 to processor 24. In some embodiments, SVS 16 may include a data storage device (not shown) containing a database with data relating to the topography, which may represent various runways and taxiways and/or man-made structures located along the aircraft's path. In some embodiments, the data storage device may contain such airport data for an entire geographical region such as a state, a country or continent. SVS 16 may also access or include a position determining unit that is configured to determine the position of the aircraft with respect to the surface of the earth. Such a position determining unit may include, but is not limited to, a GPS system, an inertial navigation system, and the like. SVS 16 may be configured to receive course, speed and other avionics inputs relating to the aircraft's heading, altitude and attitude. In equivalent embodiments, SVS 16 may receive the GPS and avionics inputs from the aircraft's GPS and avionics sensors 14.

In some embodiments, SVS 16 may include a dedicated processor, microprocessor, or other circuitry that is configured to take the information pertaining to the position, attitude, altitude and heading of the aircraft and to utilize the information available in the database to generate a third signal 30 that may be utilized by processor 24 to render a two-dimensional image or a three-dimensional image of the topographical environment on which the aircraft is taxiing. In other embodiments, SVS 16 may not include a dedicated processor, microprocessor or other circuitry. In such embodiments, third signal 30 would contain the unprocessed sensor information and location data which could then be utilized by processor 24 to render the three dimensional image of the topographical environment. In either event, SVS 16 is configured to provide third signal 30 to processor 24.

The ground status sensor 18 senses hazards such as objects near the aircraft and includes, for example, a radar, and preferably a wingtip radar on both wingtips. The ground status sensor 18 may alternatively be incorporated into the GPS/Avionics system 14. Alternatively, an object may be detected by the EVS 12.

The display unit 20, as noted above, in response to display commands supplied from the processor 24, selectively renders on the display screen 22 various textual, graphic, and/or iconic information, and thereby supply visual feedback to the operator. It will be appreciated that the display unit 20 may be implemented using any one of numerous known display screens suitable for rendering textual, graphic, and/or iconic information in a format viewable by the operator. Non-limiting examples of such displays include various cathode ray tube (CRT) displays, and various flat panel displays such as various types of LCD (liquid crystal display) and TFT (thin film transistor) displays. The display unit 20 may additionally be implemented as a panel mounted display, a HUD (head-up display) projection, or any one of numerous known technologies. It is additionally noted that the display unit 20 may be configured as any one of numerous types of aircraft flight deck displays. For example, it may be configured as a multi-function display, a horizontal situation indicator, or a vertical situation indicator. In the depicted embodiment, however, the display unit 20 is configured as a primary flight display (PFD). In some embodiments, display unit 20 may include multiple display screens 22 and system 10 may include multiple display units 20.

Processor 24 may be any type of computer, computer system, microprocessor, collection of logic devices, or any other analog or digital circuitry that is configured to calculate, and/or to perform algorithms, and/or to execute software applications, and/or to execute sub-routines, and/or to be loaded with and to execute any type of computer program. Processor 24 may comprise a single processor or a plurality of processors acting in concert. In some embodiments, processor 24 may be dedicated for use exclusively with system 10 while in other embodiments processor 24 may be shared with other systems on board the aircraft. In still other embodiments, processor 24 may be integrated into any of the other components of system 10. For example, in some embodiments, processor 24 may be a component of SVS 16 or of EVS 12.

Processor 24 is communicatively coupled to the EVS 12, GPS/avionics sensors 14, the SVS 16, and the ground status sensor 18 and is operatively coupled to the display unit 20. Such communicative and operative connections may be effected through the use of any suitable means of transmission, including both wired and wireless connections. For example, each component may be physically connected to processor 24 via a coaxial cable or via any other type of wired connection effective to convey electronic signals. In other embodiments, each component may be communicatively connected to processor 24 across a bus or other similar communication corridor. Examples of suitable wireless connections include, but are not limited to, a Bluetooth connection, a Wi-Fi connection, an infrared connection or the like.

Being communicatively and/or operatively coupled with EVS 12, GPS/avionics sensors 14, SVS 16, ground status sensor 18, and display unit 20, provides processor 24 with a pathway for the receipt and transmission of signals, commands, instructions, and interrogations to and from each of the other components. Processor 24 is configured (i.e., loaded with and being capable of executing suitable computer code, software and/or applications) to interact with and to coordinate with each of the other components of system 10 for the purpose of overlaying images corresponding to first signal 26 and third signal 30. For example, in the illustrated embodiment, processor 24 is configured to receive the third signal 30 from SVS 16 and to send a command to display unit 20 instructing display unit 20 to display a corresponding SVS image on a display screen 22.

Processor 24 is also configured to receive first signal 26 from EVS 12 and to send a command to display unit 20 instructing display unit 20 to display the EVS image on display screen 22. Processor 24 is further configured to command display unit 20 to overlay the semi-transparent EVS image on top of the SVS image. Furthermore, because the EVS image actually presents what is along the aircraft's path, processor 24 may give precedence to the EVS image and may, depending on the operational status, command display unit 20 to obscure or gradually fade out portions of the SVS image, the EVS image, and/or the symbology. A fourth signal 32 is provided to the processor 24 by the ground status sensor 18 that includes information regarding objects detected around the aircraft, as further described hereinafter.

Figure 2:
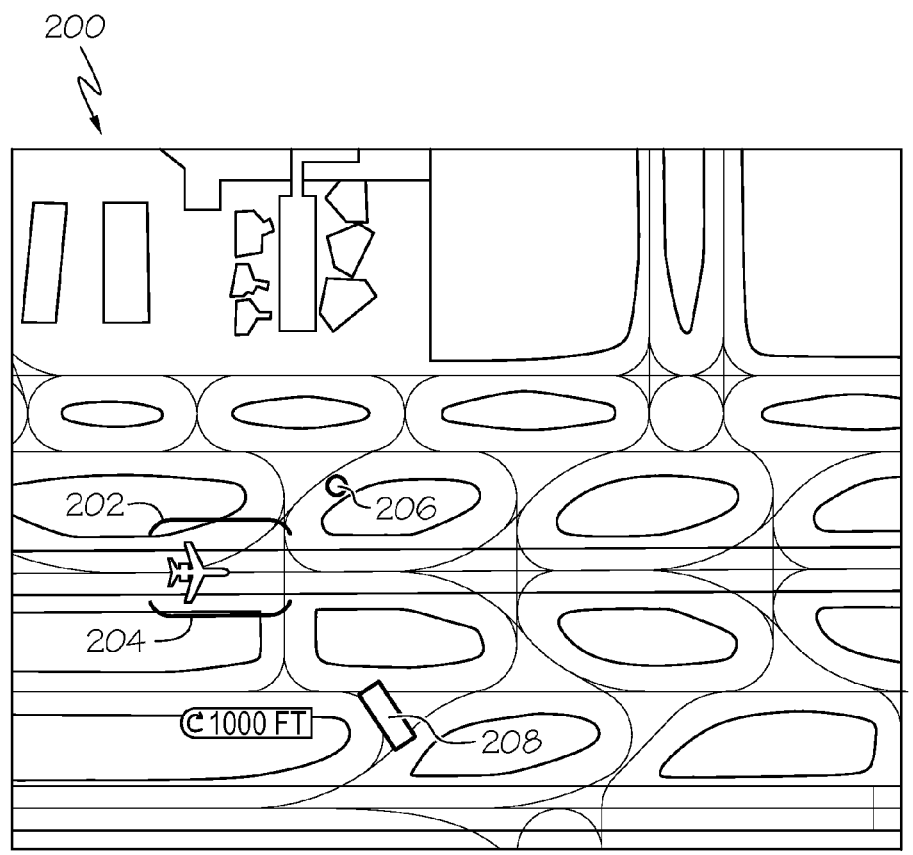
FIG. 2 is a first image displayed in accordance with a first exemplary embodiment that may be rendered on the flight display system of FIG. 1.

In accordance with a first exemplary embodiment 200 of FIG. 2, a swath icon 202, which otherwise may be known as an area or a wingtip swath symbology, displayed on an airport moving map of display unit 20 depicts a safety zone around an aircraft 204 that is free of obstacles or hazards, thereby enhancing the situational awareness of a pilot taxiing the aircraft 204. While the swath icon 202 is represented by brackets as shown, the swath icon 202 may be indicated by any highlighted area and may be of any shape. The pilot may navigate within the swath icon 202 and be assured that the aircraft 204 will not be in an immediate collision course to intercept an obstacle. Ground status sensor 18 is preferably installed on the left and right wingtips of the aircraft 204, as a radar system, that continuously scans a sector for any kind of solid obstacle that might result in a collision with the aircraft 204. In this exemplary embodiment, a point obstacle 206 can be represented by a circle or a dot, and any other solid obstacle 208 can be represented by a polygon, for example, a rectangle, for reduced display clutter and pilot workload. The obstacles 206, 208 outside the swath icon 202 may be color coded colors of less emphasis, for example, grey, to indicate a no-threat obstacle.

Figure 3:
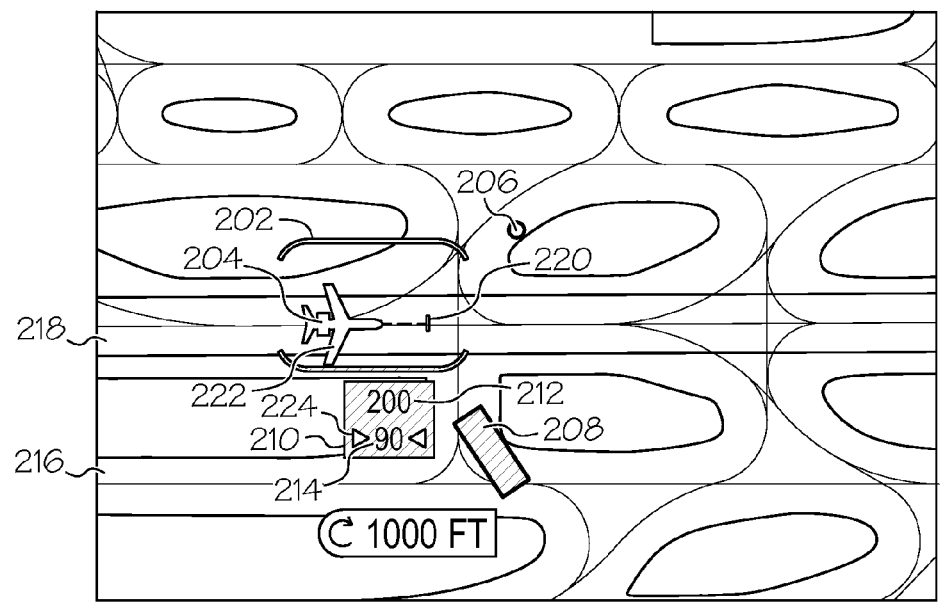
FIG. 3 is a second image displayed in accordance with the second exemplary embodiment.

Referring to FIG. 3, the distance 212 of the obstacle 208, for example, from the aircraft 204 may be shown in a cutout box 210 near the swath icon 202 and may be color coded to a color of less emphasis, for example, grey, when the obstacle 208 is not a threat, but would turn either amber or red, for example, as the degree of threat to the aircraft 204 increases. Below the distance 212 readout, the width 214 of the swath icon 202 between the two brackets is displayed as a numeric readout. The distance 212 and width 214 will be shown in reverse amber when the swath icon 202 turns amber and will be shown in inverse red when the swath icon 202 is red. These representations not only provide greater situational awareness but also an assessment of the threat due to the obstacles location. The swath icon is drawn and colored based on the obstacles' location/position. Also, the width of the swath icon takes into the account, the width of the taxiway 216 or runway 218 the aircraft occupies. This provides guidance for maintaining the aircraft on the runway/taxiway.

In addition to the display of the distance 212 and width 214, the aircraft stopping distance may also be represented within the swath icon as a distance icon 220, for example, a bar. This provides a visual depiction of the location where the aircraft would be able stop to avoid a hazard, for example, the obstacle 208. Based on the position of the obstacle 208, the swath icon 202 may expand or contract, and based on the safety margins, may become either amber or red. If the obstacle 208 is close to the wingtip, the swath icon 202 in the corresponding side 222 will move closer to the aircraft 204, as shown in FIG. 3, and will turn amber. Amber indicates that the obstacle is close and any deviation towards that side will result in a collision. If the obstacle comes even closer such that it will collide with the aircraft wingtip, then the swath icon turns red. Additionally, arrows 224 indicate that the numerals therebetween mean the width of the swath icon 202, and may blink to attract the pilots attention when the swath icon 202 changes colors.

To ensure that the display doesn't get cluttered with too much readout, the numeric cutout box 210 can be displayed only for the closest obstacle and of higher threat level, and optionally only when the obstacle is so close that the swath icon bracket turns amber or red.

Figure 4:
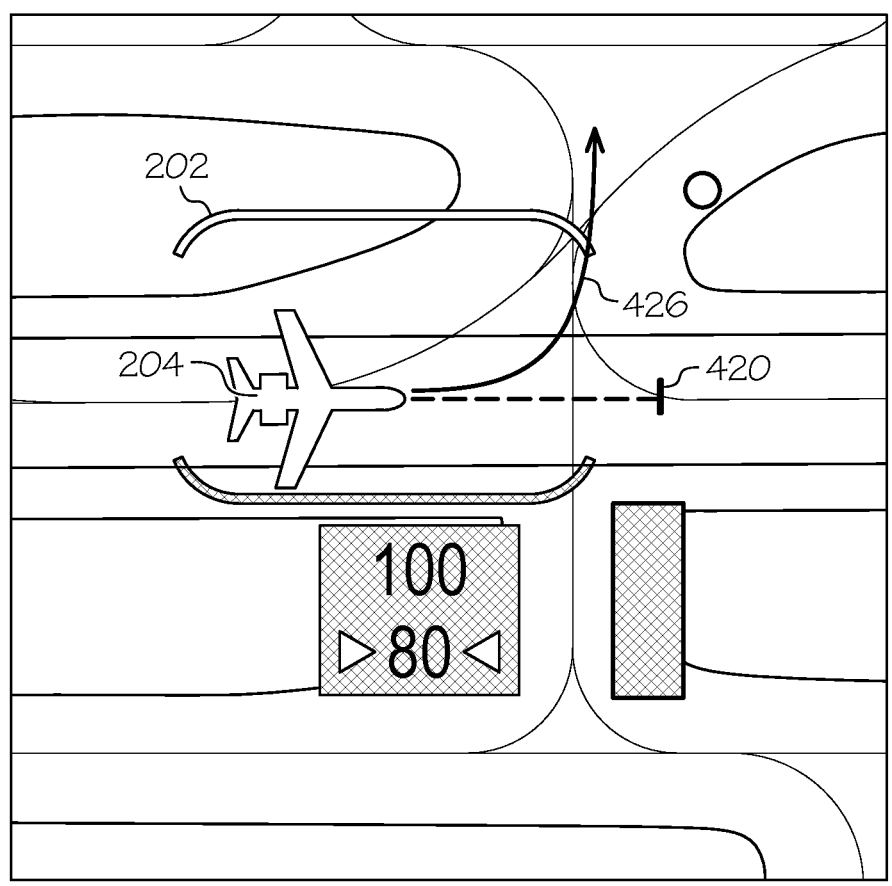
FIG. 4 is a second image displayed in accordance with the third exemplary embodiment.

Referring to FIG. 4, if, for example, one of the sides (colored red) of the swath icon 202 is close to the aircraft 204 and the other side (colored green) is not close to the aircraft 204, the system assesses the stopping distance of the aircraft 204 and indicates, by the bar 420, where the pilot would be able to stop to avoid the collision if brakes were applied. However, if the pilot fails to reduce speed to avoid a collision, the system recognizes exit routes based on adjacent obstacles information, the airport moving map database, and aircraft type and provides an arrow 426, preferably in green, indicating the safest maneuver for exiting the taxiway to avoid collision. If obstacles exist on both sides, both swath icons turn red and the pilot has to stop the aircraft to avoid a collision.

Figure 5:
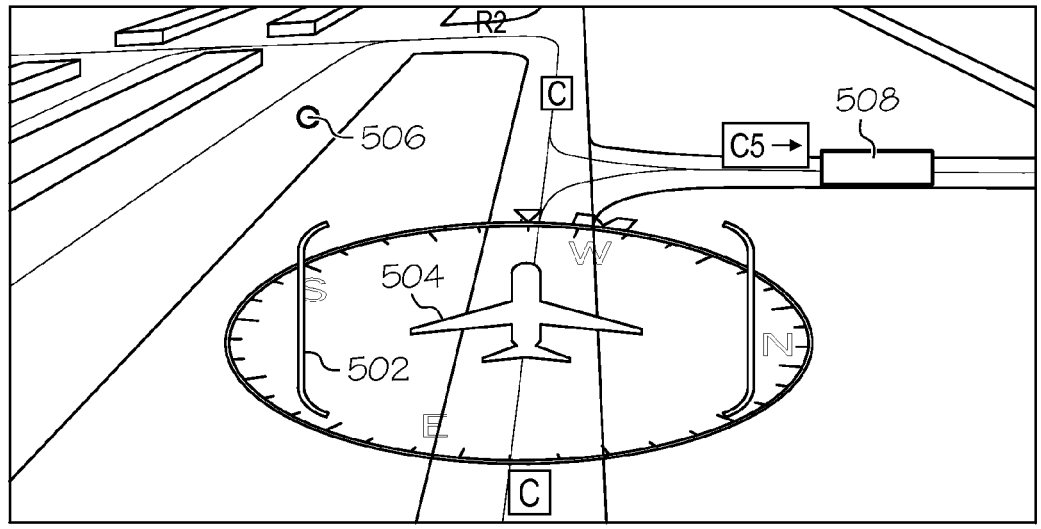
FIG. 5 is a second image displayed in accordance with the fourth exemplary embodiment.

The above display and symbology can also be extended to a three dimensional airport moving map display (FIG. 5) that is part of the synthetic vision system 16 of FIG. 1. The same symbology shown in FIGS. 2-4 may be displayed on the three dimensional airport moving map. Square brackets 502 indicate a safety zone around the aircraft 504 within which a pilot can operate to avoid collisions with obstacles 506, 508 on the airport surface.

Figure 6:
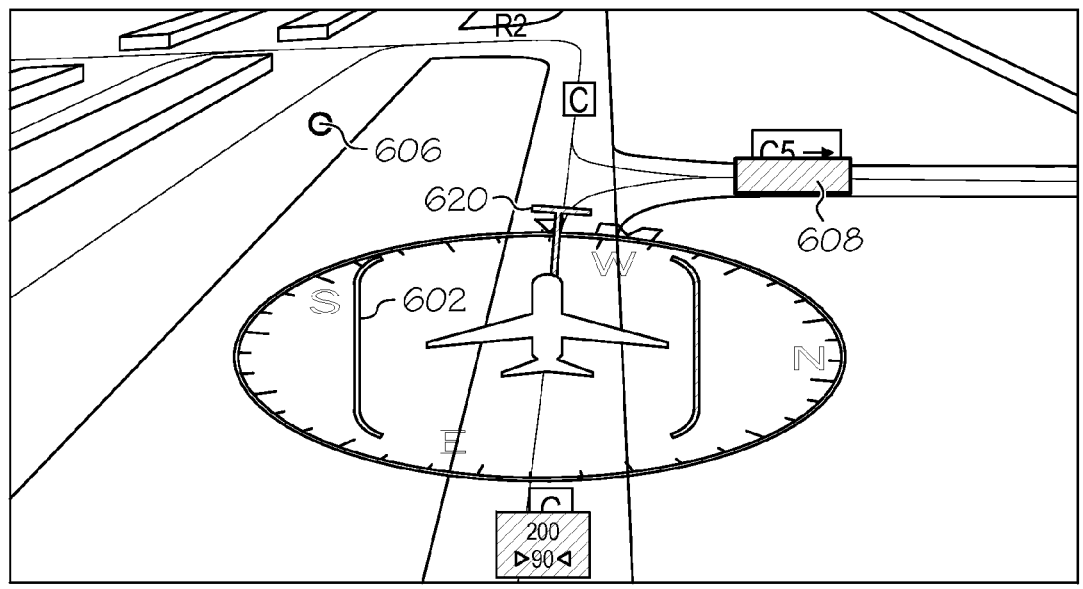
FIG. 6 is a second image displayed in accordance with the fifth exemplary embodiment.

Similar to the two dimensional airport moving map display, the swath icon 602 will expand and contract, as shown in FIG. 6 based on the obstacle location, and also become either amber or red based on the distance of the obstacles 606, 608 from the aircraft 604. The visual depiction of the distance at which the aircraft 604 may be stopped is represented by a bar 620, indicating the point at which the aircraft would be positioned after stopping.

Figure 7:
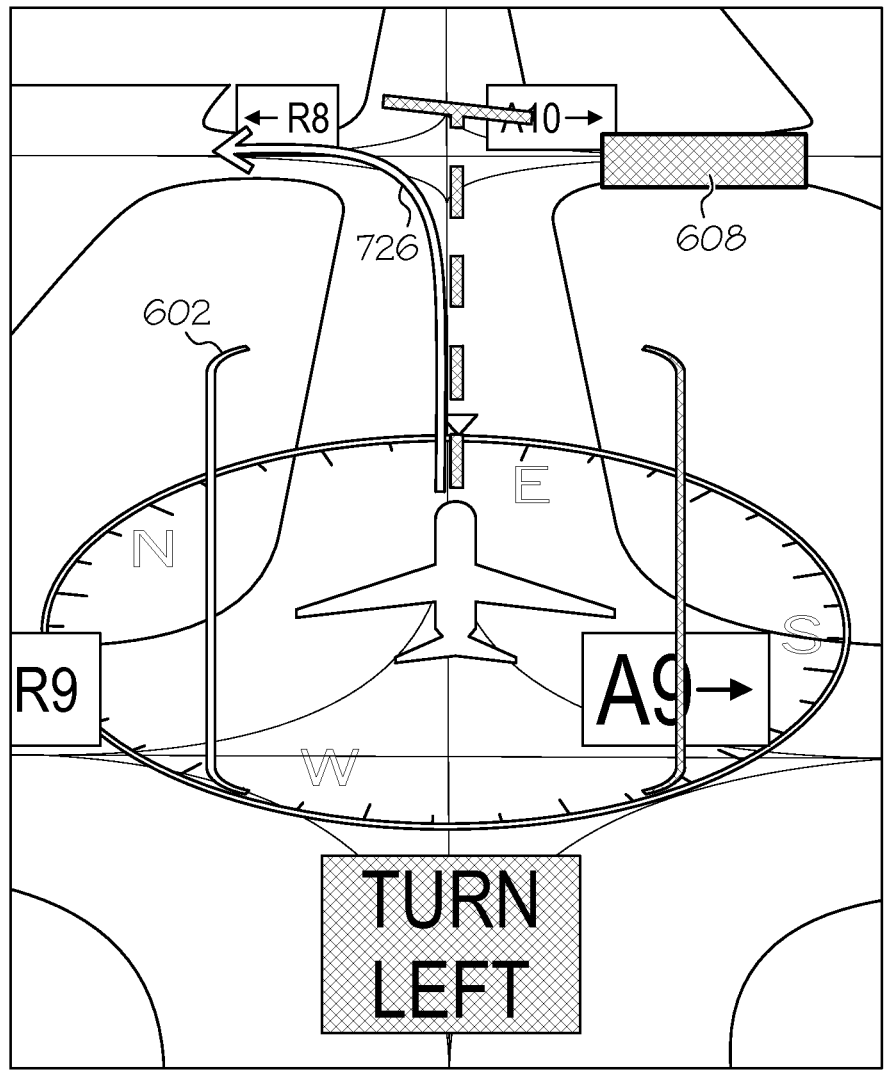
FIG. 7 is a second image displayed in accordance with the sixth exemplary embodiment.

However, if the pilot fails to reduce speed to avoid a collision, the system recognizes exit routes based on adjacent obstacles information, the airport moving map database, and aircraft type and provides an arrow 726 (see FIG. 7), preferably in green, indicating the safest maneuver for exiting the taxiway to avoid collision. If obstacles exist on both sides, both swath icons turn red and the pilot has to stop the aircraft to avoid a collision.

Figure 8:
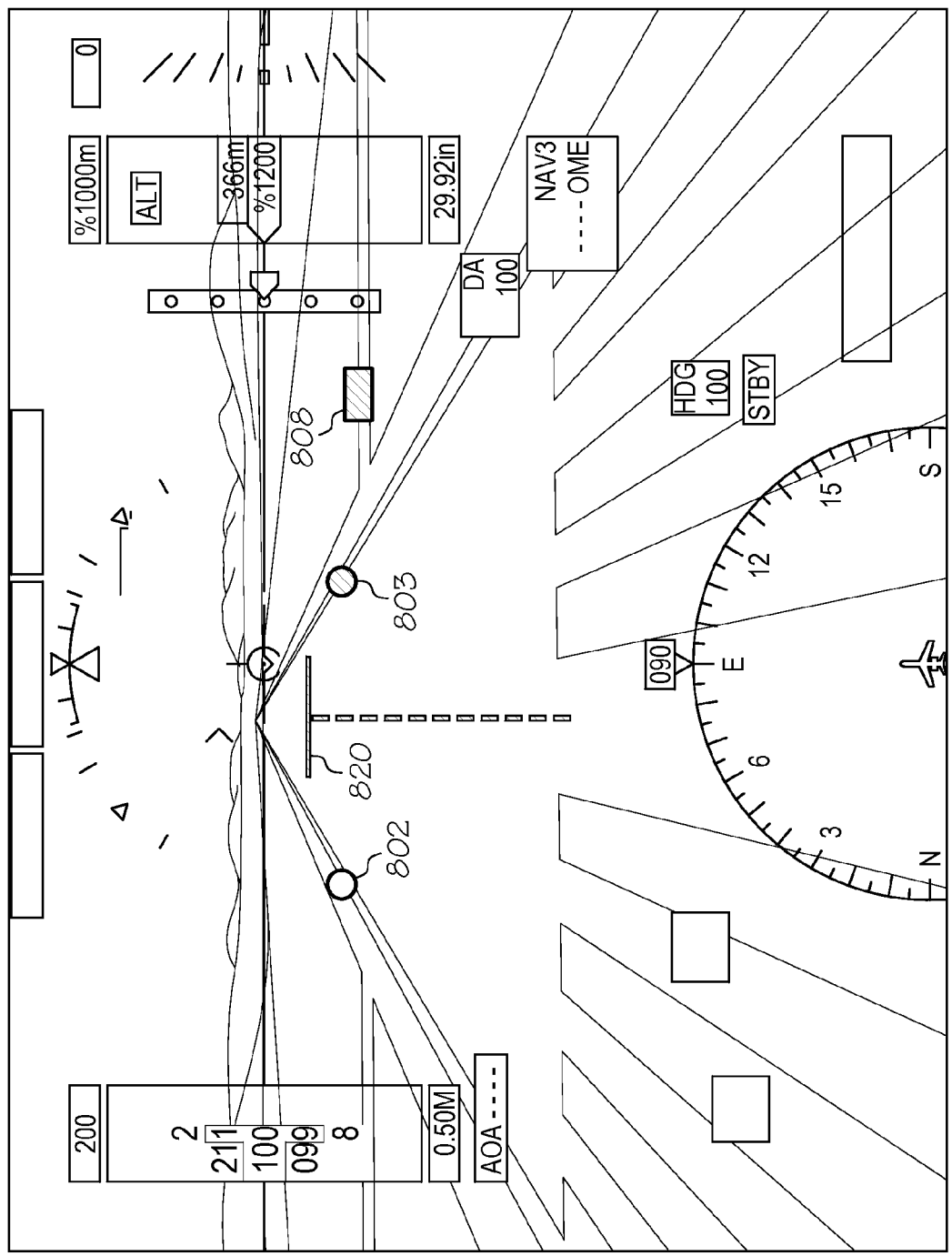
FIG. 8 is a second image displayed in accordance with the seventh exemplary embodiment.

Referring to FIG. 8, on the three dimensional airport moving map, the swath icon 502 may be represented by fixed reference dots 802 and 803, indicating the range of the coverage area of the wingtip radar. Similar to the swath icon 502, the dots 802, 803 may be color coded to represent the threat level of the obstacle 808. As shown in FIG. 8, the obstacle 808 is in close proximity to the right side of the aircraft. Hence the right dot 803 is color-coded amber, for example, and a visual depiction of the stopping distance is represented by the bar 820.

Figure 9:
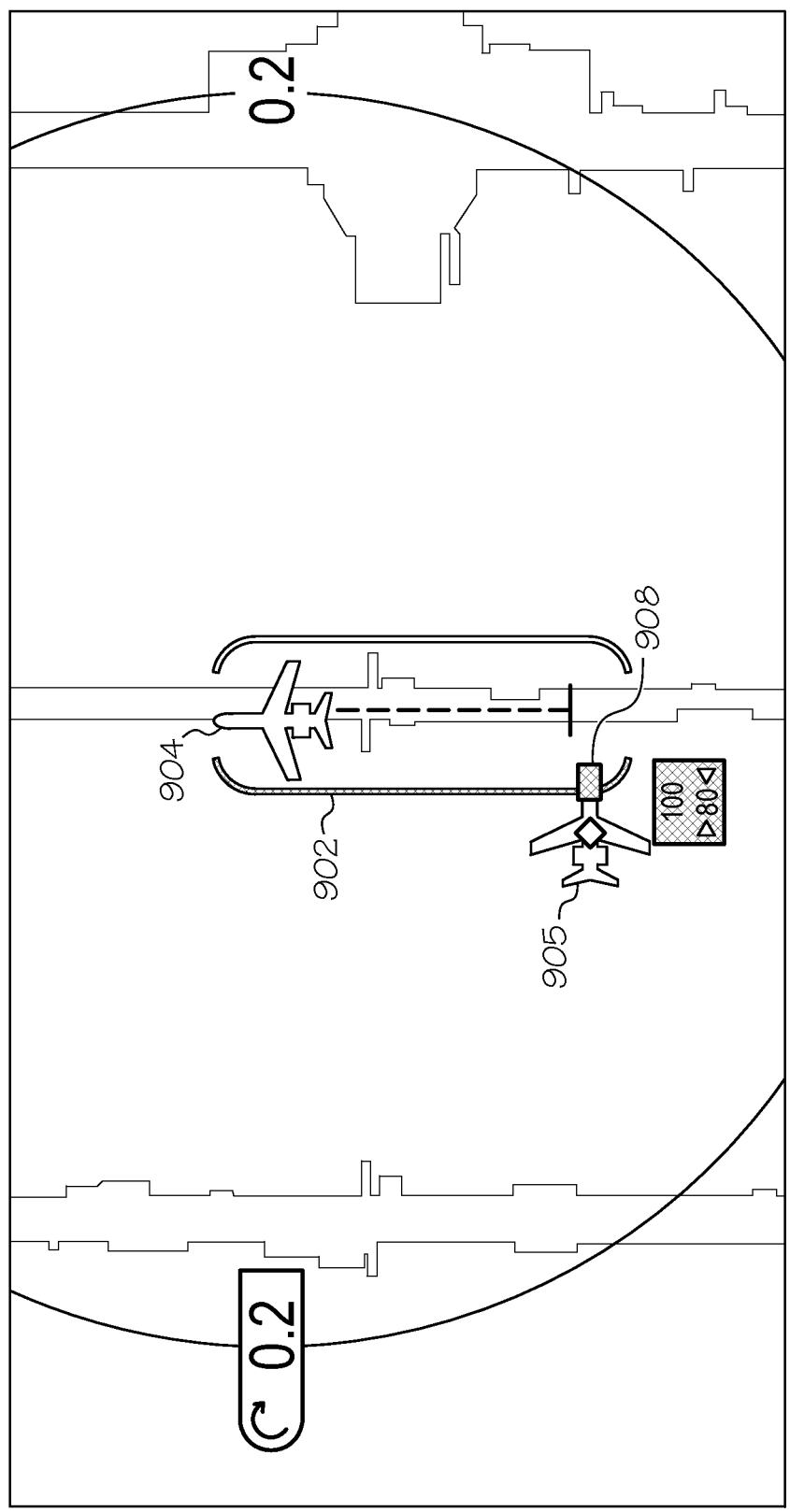
FIG. 9 is a second image displayed in accordance with the eighth exemplary embodiment.

The ground status sensor 18 can also have sensors to monitor obstacles behind the aircraft, especially for use when the aircraft is towed backwards to the gate. Accordingly, the swath icon 902 is drawn to the rear of the aircraft 904 (FIG. 9) whenever the aircraft moves backwards. In this exemplary embodiment, another aircraft 905 has its nose directly in the path of the aircraft 904. The ground status sensor 18 scans the traffic aircraft 905 as an obstacle and displays the obstacle 908 on the airport moving map. The left swath icon 902 would also shown in red to alert about the possibility of an impending collision.

Figure 10:
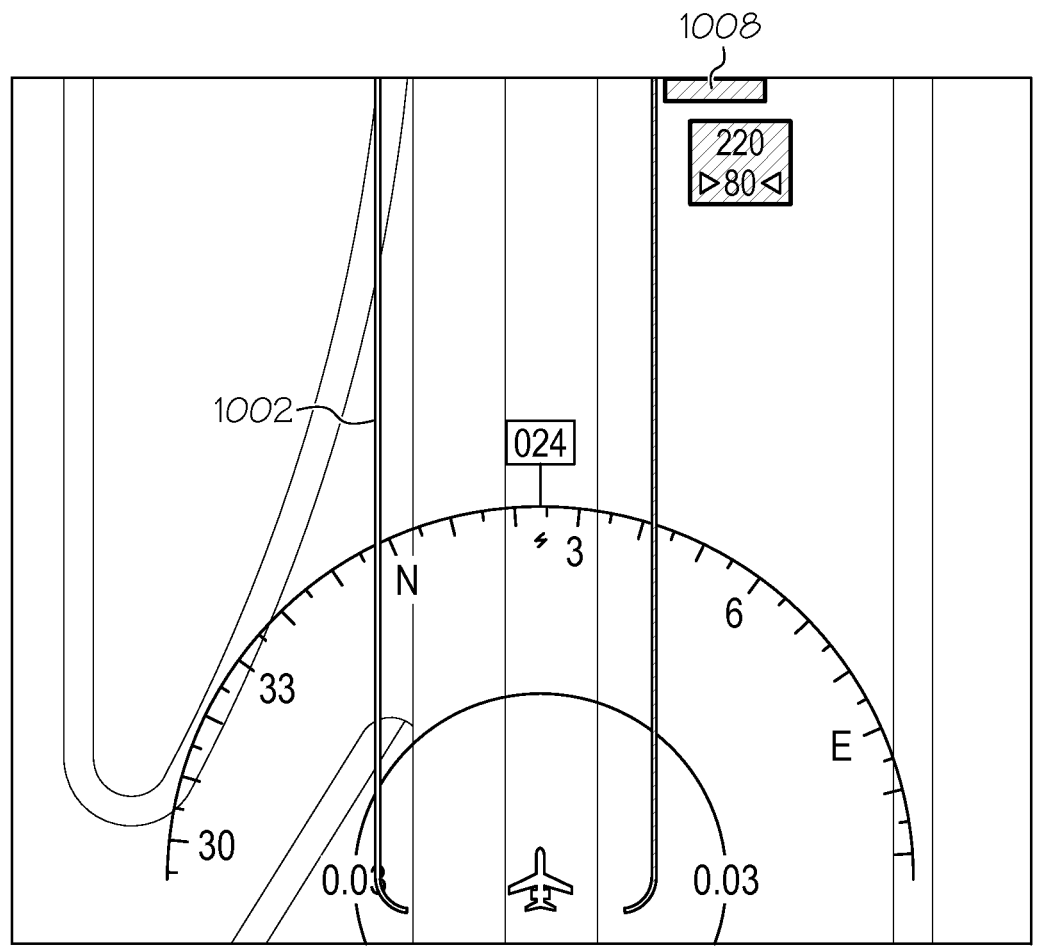
FIG. 10 is a second image displayed in accordance with the ninth exemplary embodiment.

Based on the range setting on the airport moving map, the obstacle display could be outside the current view of the map, but still in close proximity to the aircraft. For example, if the obstacle display is off the map for the selected range, the pilot may be alerted to the obstacle by displaying it at the edge of the airport map view (FIG. 10), showing half of the obstacle 1008 with the complete distance readout. The swath icon 1002 can also be extended to the edge of the map view.

Figure 11:
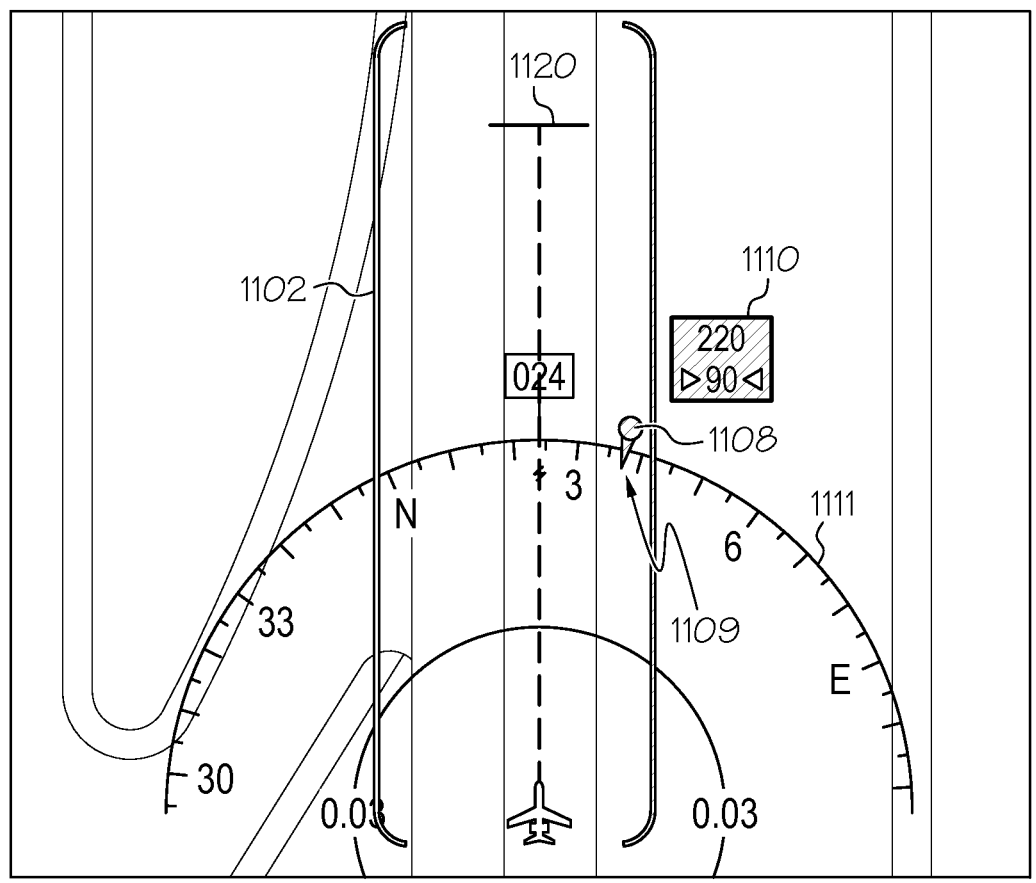
FIG. 11 is a second image displayed in accordance with the tenth exemplary embodiment.

The swath icon 1102 and obstacles 1108 can also be represented in the heading mode as shown in FIG. 11. Even when the obstacle 1108 is outside the current view of the aircraft, the angular deviation to the obstacle 1108 can be displayed in the heading scale, in addition to the linear distance readout 1110. A stopping distance representation 1120 further gives better awareness to the location of the obstacle 1108.

Figure 12:
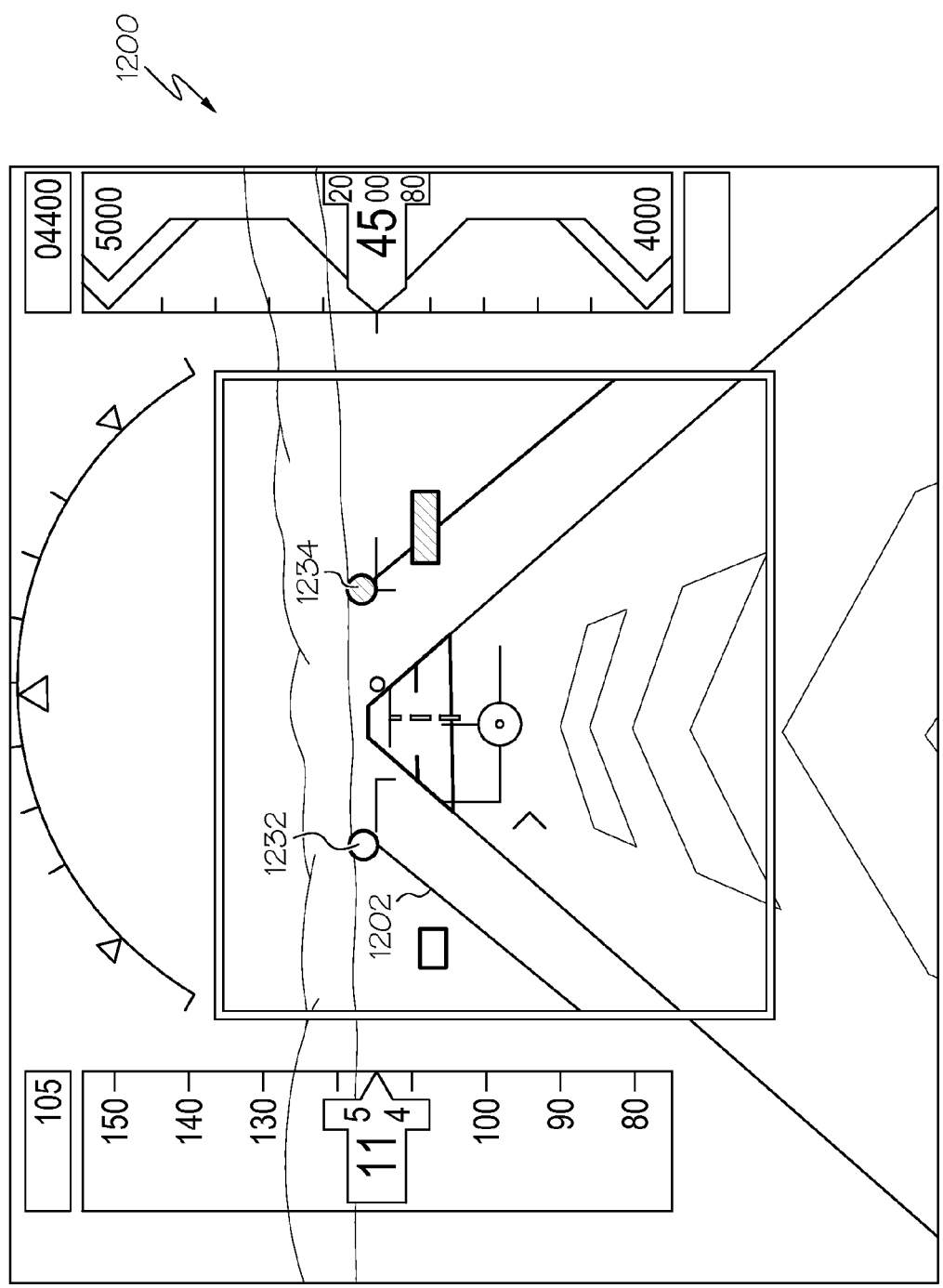
FIG. 12 is a second image displayed in accordance with the eleventh exemplary embodiment.

Referring to FIG. 12, the wingtip radar image can also be fused onto a combined vision system display 1200, e.g., the wingtip radar image fused with a forward looking infrared image on the synthetic vision display. The swath icon 1202 can be shown conformally on the combined vision system display. The swath icon 1202 typically will be shown a bit diagonally, similar to railway tracks, as the lines converge as the distance increases. Two references symbols 1232, 1234, for example, circles, are also displayed, indicating the end of the coverage area of the radar. Similar to the map display, the swath icon lines will be color coded (green/amber/red) based on the location of obstacles in or near the swath icon 1202 area.

Figure 13:
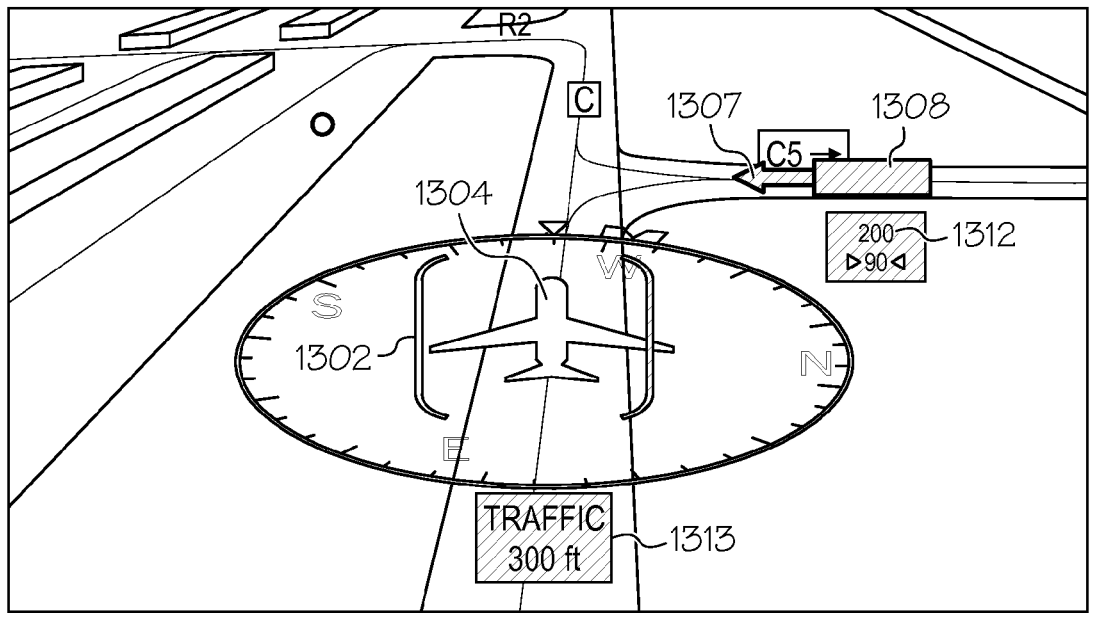
FIG. 13 is a second image displayed in accordance with the twelfth exemplary embodiment.

The trend (movement) of the obstacles 1308 (FIG. 13) scanned by the wingtip radar may also be displayed. For example, the current swath icon 1302 is very likely to turn amber and then red because the obstacle 1308 is moving in an intersecting path to the own aircraft 1304. The box 1312 displays swath width and distance to the obstacle 1308. The box 1313 displays TRAFFIC to alert the pilot to the obstacle 1308 and displays a distance, 300 feet, as the stopping distance of the aircraft 1304. Textual display of annunciations like STOP may replace TRAFFIC to provide additional warning to the pilot.

Figure 14:
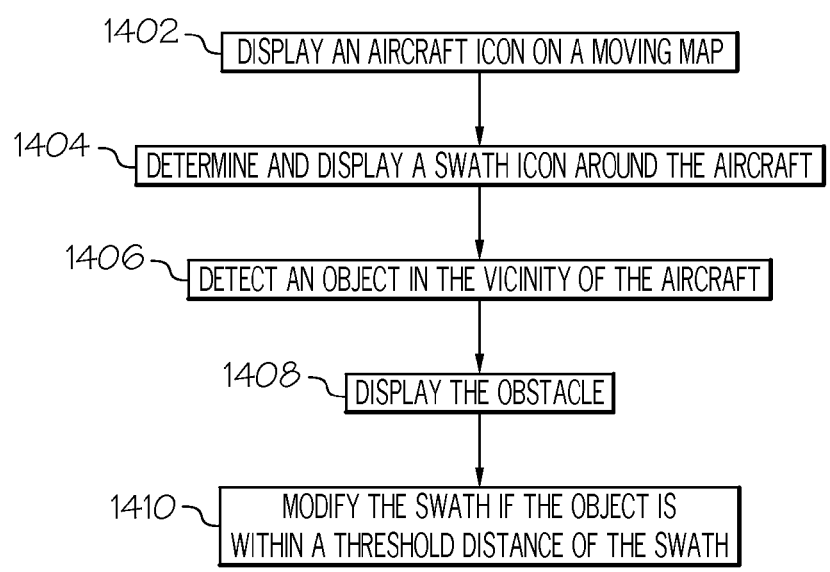
FIG. 14 is a flow diagram of a method for generating the first image, in accordance with an exemplary embodiment.
Figure 15:
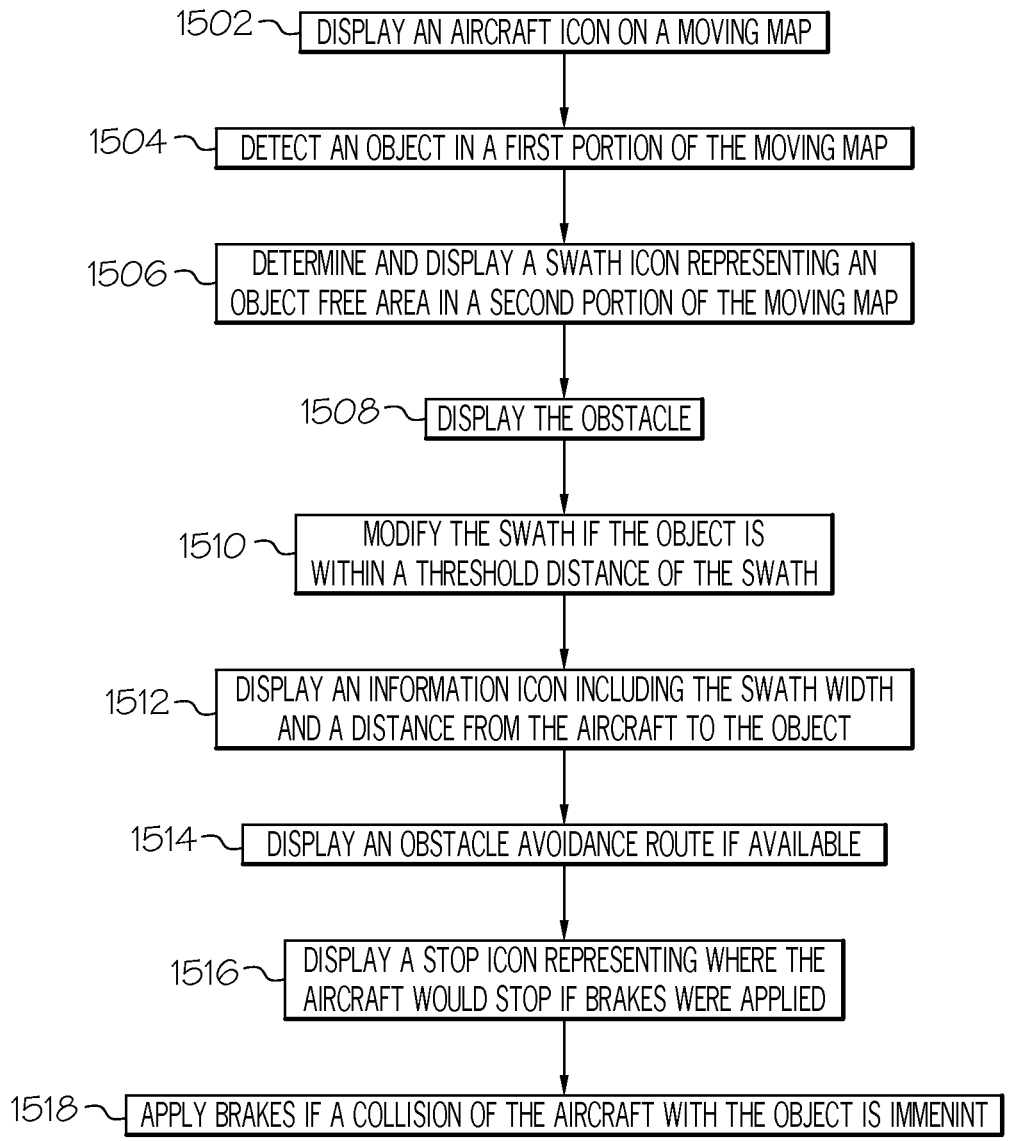
FIG. 15 is a flow diagram of a method for generating another image, in accordance with an exemplary embodiment.

FIGS. 14 and 15 are flow charts that illustrate exemplary embodiments of a process 1400, 1500 suitable for use with a flight deck display system such as the display unit 20. Methods 1400, 1500 represent implementations of methods for displaying objects on an onboard display unit 20 of a host aircraft. The various tasks performed in connection with methods 1400, 1500 may be performed by software, hardware, firmware, or any combination thereof. In practice, portions of methods 1400, 1500 may be performed by different elements of the described system, e.g., a processor or a display element. It should be appreciated that methods 1400, 1500 may include any number of additional or alternative tasks, the tasks shown in FIGS. 14, 15 need not be performed in the illustrated order, and methods 1400, 1500 may be incorporated into a more comprehensive procedure or process having additional functionality not described in detail herein. Moreover, one or more of the tasks shown in FIGS. 14, 15 could be omitted from an embodiment of the methods 1400, 1500 as long as the intended overall functionality remains intact.

Referring to FIG. 14, a first exemplary method includes displaying an aircraft icon representing the aircraft on the moving map; detecting a hazard in a first portion of the moving map; displaying a swath icon representing the hazard free area in a second portion of the moving map and surrounding the aircraft; and displaying the hazard.

A second exemplary method of FIG. 15 includes displaying an aircraft icon representing the aircraft on the moving map; displaying a swath icon representing an area around the aircraft; detecting an object in the vicinity of the aircraft; displaying the object; and modifying the swath icon if the object is within a first threshold distance of the swath.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A method for indicating a hazard free area around a vehicle on a moving map, the vehicle comprising a type, comprising:
    displaying an icon representing the vehicle on the moving map;
    displaying a swath icon on the moving map, the swath icon depicting a zone around the icon representing the vehicle, the swath icon representing an object free area around the vehicle;
    detecting, based on a signal provided by a sensor on the vehicle, an object moving in the vicinity of the vehicle;
    displaying the detected object on the moving map;
    recognizing a maneuver the vehicle may take to avoid a collision with the detected object, based on the detected object, the moving map, and the vehicle type;
    displaying a second icon indicating the maneuver; and
    modifying the swath icon to contract based on a position of the detected object within a first threshold distance of the vehicle.

2. The method of claim 1 further comprising:
    modifying the swath icon further if a collision of the vehicle with the detected object is projected.

3. The method of claim 1 further comprising:
    displaying a numerical representation of the width of the area.

4. The method of claim 1 further comprising:
    displaying a numerical representation of a distance from the vehicle to the detected object.

5. The method of claim 4 further comprising:
    highlighting the numerical representation of the distance when the distance from the vehicle to the detected object reaches a threshold.

6. The method of claim 4 further comprising:
    providing a text message warning of the detected object when the first threshold distance is reached.

7. The method of claim 1 further comprising:
    indicating a position on the moving map within the swath icon where the vehicle will stop if brakes are applied.

8. The method of claim 1 further comprising:
    determining the maneuver by analyzing a current speed of the vehicle.

9. The method of claim 1, wherein modifying the swath icon to contract comprises moving the swath icon representing the object free area closer to the icon representing the vehicle.

10. The method of claim 1, further comprising displaying a distance icon within the swath icon at a position on the moving map where the vehicle will stop if brakes are applied.

11. A method for indicating a hazard free area around an aircraft on a moving map, comprising:
    displaying an aircraft icon representing the aircraft on the moving map;
    detecting a hazard moving in the vicinity of the aircraft by radar system on the aircraft in a first portion of the moving map;
    displaying a swath icon representing the hazard free area in a second portion of the moving map and surrounding the aircraft;
    altering a size of the swath icon to contract when a distance between the aircraft and the detected hazard is within a threshold;

recognizing a maneuver the aircraft may take to avoid a collision with the detected hazard, based on the detected hazard, the moving map, and aircraft type;
displaying an icon indicating the maneuver; and
displaying the detected hazard on the moving map.

12. The method of claim 11 further comprising:
modifying the swath icon further if a collision of the aircraft with the detected hazard is projected.

13. The method of claim 11 further comprising:
displaying a numerical representation of the width of the hazard free area; and
displaying a numerical representation of the distance from the aircraft to the detected hazard.

14. A system for indicating a hazard free area around a vehicle on a moving map, the system comprising:
a display;
a sensor on the vehicle configured to sense an object moving in the vicinity of the vehicle;
a synthetic vision system configured to provide the moving map;
a processor coupled to the display, the sensor, and the synthetic vision system, and the processor configured to:
instruct the display to display the moving map and an icon representing the vehicle on the moving map;
instruct the display to display a swath icon depicting a zone around the icon representing the vehicle, the swath icon representing the hazard free area around the vehicle;
instruct the display to display the sensed object;
recognize a maneuver the vehicle may take to avoid a collision with the sensed object based on the sensed object, the moving map, and aircraft type;
display a second icon indicating the maneuver; and
modify the swath icon to contract based on a position of the sensed object if a distance between the vehicle and the sensed object is within a threshold.

15. The system of claim 14 wherein the processor is further configured to:
modify the swath icon further if a collision of the vehicle with the sensed object is projected.

16. The system of claim 14 wherein the processor is further configured to:
display a numerical representation of the width of the hazard free area.

17. The system of claim 14 wherein the processor is further configured to:
display a numerical representation of the distance from the vehicle to the sensed object.

18. The system of claim 14 wherein the processor is further configured to:
indicate a position on the moving map where the vehicle will stop if brakes are applied.

19. The system of claim 14 wherein the processor is further configured to:
determine the maneuver by analyzing a current speed of the vehicle.

20. The system of claim 14, the vehicle comprising an aircraft, wherein the processor is further configured to:
apply the brakes when an aircraft system determines a collision of the aircraft with the sensed object will otherwise occur.

* * * * *